(12) United States Patent
Berger et al.

(10) Patent No.: US 10,495,214 B2
(45) Date of Patent: Dec. 3, 2019

(54) HYDRAULIC CONTROL SYSTEM FOR AN AUTOMATIC TRANSMISSION

(71) Applicant: GM GLOBAL TECHNOLOGY OPERATIONS LLC, Detroit, MI (US)

(72) Inventors: Todd R. Berger, Pinckney, MI (US); Kelly Eber, Oxford, MI (US); Steven P. Moorman, Dexter, MI (US); Christopher G. Benson, Rochester Hills, MI (US); Cheol W. Kim, Canton, MI (US); Ryan M. Jenness, Ypsilanti, MI (US); Christopher M. Kaminski, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 101 days.

(21) Appl. No.: 15/690,720

(22) Filed: Aug. 30, 2017

(65) Prior Publication Data

US 2019/0063597 A1  Feb. 28, 2019

(51) Int. Cl.
| | | |
|---|---|---|
| F16H 61/00 | (2006.01) | |
| F16D 25/00 | (2006.01) | |
| F16D 41/00 | (2006.01) | |
| F16D 48/02 | (2006.01) | |
| F16H 61/30 | (2006.01) | |
| F16H 61/02 | (2006.01) | |
| F16H 61/14 | (2006.01) | |
| F16H 63/34 | (2006.01) | |

(52) U.S. Cl.
CPC ......... *F16H 61/0021* (2013.01); *F16D 25/00* (2013.01); *F16D 41/00* (2013.01); *F16D 48/02* (2013.01); *F16H 61/0206* (2013.01); *F16H 61/30* (2013.01); *F16D 2048/0221* (2013.01); *F16H 61/14* (2013.01); *F16H 63/3483* (2013.01); *F16H 2061/0209* (2013.01); *F16H 2200/0065* (2013.01); *F16H 2200/2046* (2013.01); *F16H 2200/2079* (2013.01)

(58) Field of Classification Search
None
See application file for complete search history.

(56) References Cited

U.S. PATENT DOCUMENTS

| | | | |
|---|---|---|---|
| 8,932,167 B2 | 1/2015 | Berger et al. | |
| 10,167,948 B2* | 1/2019 | Ghike | F16H 61/0286 |
| 2012/0175210 A1* | 7/2012 | Moorman | F16H 61/0206 |
| | | | 192/3.33 |
| 2013/0112524 A1* | 5/2013 | Moorman | F16H 61/684 |
| | | | 192/85.63 |

OTHER PUBLICATIONS

Steve Bodofsky, Understanding Transmission Solenoids, Apr. 2008 (Year: 2008).*
Unpublished U.S. Appl. No. 15/648,866, filed by GM Global Technology Operations LLC on Jul. 13, 2017.

* cited by examiner

*Primary Examiner* — Timothy Hannon

(57) ABSTRACT

A hydraulic control system for a transmission of a motor vehicle includes a source of pressurized hydraulic fluid that communicates with an analog electronic transmission range selection (ETRS) subsystem or a manual valve. The ETRS subsystem includes an ETRS valve, a park servo, a park mechanism, a mode valve, and a plurality of solenoids. The ETRS and manual valve communicate with a clutch actuator subsystem that engages a one-way clutch and six clutches/brakes.

1 Claim, 3 Drawing Sheets

| | A | | | | | | | B | | |
|---|---|---|---|---|---|---|---|---|---|---|
| | 216 (CB123456) | 218 (CB29) | 220 (CB38) | 222 (C4) | 224 (C57R) | 241/214 (SOWC/C6789) | 260 | 186 | 134 | 136 | 182 |
| Park | 0 | 0 | 0 | 0 | 0 | | 1 | 0 | 0 | 0 | 0 |
| Reverse | 0 | 0 | 0 | 1 | 1 | 1 | 1 | 1 | 0 | 1 | 1 |
| Neutral-Shift | 0 | 0 | 1 | 1 | 0 | 1 | 1 | 1 | 1 | 1 | 1 |
| Neutral LO | 0 | 0 | 0 | 0 | 0 | 1 | 0 | 1 | 0 | 0 | 1 |
| Neutral HI | 0 | 0 | 0 | 1 | 0 | 0 | 0 | 1 | 0 | 1 | 1 |
| Drive1B | 1 | 0 | 0 | 0 | 0 | 1 | 0 | 1 | 1 | 0 | 1 |
| Drive1FW | 1 | 1 | 0 | 0 | 0 | 0 | 0 | 1 | 1 | 0 | 1 |
| Drive2 | 1 | 0 | 1 | 0 | 0 | 0 | 0 | 1 | 1 | 0 | 1 |
| Drive3 | 1 | 0 | 0 | 1 | 0 | 0 | 0 | 1 | 1 | 0 | 1 |
| Drive4 | 1 | 0 | 0 | 0 | 1 | 0 | 0 | 1 | 1 | 0 | 1 |
| Drive5 | 1 | 0 | 0 | 0 | 0 | 1 | 0 | 1 | 1 | 0 | 1 |
| Drive6 | 0 | 0 | 0 | 0 | 0 | 1 | 0 | 1 | 1 | 0 | 1 |
| Drive7 | 0 | 0 | 1 | 0 | 0 | 1 | 0 | 1 | 1 | 1 | 1 |
| Drive8 | 0 | 0 | 0 | 0 | 0 | 1 | 0 | 1 | 1 | 1 | 1 |
| Drive9 | 0 | 1 | 0 | 0 | 0 | 1 | 0 | 1 | 1 | 1 | 1 |

*Fig-2*

HYDRAULIC CONTROL SYSTEM FOR AN AUTOMATIC TRANSMISSION

TECHNICAL FIELD

The invention relates to a control system for an automatic transmission, and more particularly to an electro-hydraulic control system.

INTRODUCTION

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a hydraulically actuated automatic transmission.

SUMMARY

A hydraulic control system for a transmission is provided. The hydraulic control system includes a source of pressurized hydraulic fluid that communicates with an analog electronic transmission range selection (ETRS) subsystem or a manual valve. The ETRS subsystem may include an ETRS valve, a park servo valve, a park mechanism, a mode valve, and a plurality of solenoids. The ETRS and manual valve communicate with a clutch actuator subsystem that engages a one-way clutch and six clutches/brakes.

In form, which may be combined with or separate from other forms described herein, a hydraulic control system is provided for a transmission, where the transmission has a plurality of torque transmitting devices selectively engageable to provide a plurality of forward speed ratios and at least one reverse speed ratio. The hydraulic control system includes a pressure regulator subsystem configured to provide a pressurized hydraulic fluid and a range selection subsystem in downstream fluid communication with the pressure regulator subsystem having first and second outputs. A clutch select valve assembly is in downstream fluid communication with the first and second outputs, and the clutch select valve assembly is configured to move between a first position and a second position. Clutch actuators are in downstream fluid communication with the clutch select valve assembly, where each clutch actuator is configured to actuate at least one torque transmitting mechanism. A plurality of control devices is configured to regulate transmission of pressurized hydraulic fluid to the clutch actuators, wherein one or more of control devices is normally high and configured to provide a default in a forward speed ratio.

Additional features may be provided, including but not limited to the following: wherein a second control device of the plurality of control devices is is normally high; the hydraulic control system being configured to default in a forward speed ratio if the transmission is in any forward speed ratio upon default; the plurality of clutch actuators including at least six clutch actuators and the plurality of control devices includes at least six control devices; each control device being configured to regulate transmission of hydraulic fluid to a clutch actuator; wherein four of the six control devices are normally low; the plurality of control devices being electrically activated solenoids.

Furthermore, the hydraulic control system may include a selectable one way clutch (SOWC) and a SOWC actuator in downstream fluid communication with the clutch select valve assembly and configured to actuate the selectable one-way clutch. The clutch select valve assembly may be configured to transmit pressurized hydraulic fluid from the first output to the SOWC clutch actuator when in the first position, and the clutch select valve assembly may be configured to transmit pressurized hydraulic fluid from the second output to the second actuator when in the second position. In some examples, the second actuator and the second torque transmitting mechanism are engaged in the reverse speed ratio, and the selectable one-way clutch, the first actuator, and first torque transmitting mechanism are engaged in a forward speed ratio.

The range selection subsystem may comprise a manual valve in downstream fluid communication with the pressure regulator subsystem, where the manual valve is configured to operate in a Drive state that transmits pressurized hydraulic fluid from the pressure regulator subsystem to the first output and in a Reverse state that transmits pressurized hydraulic fluid from the pressure regulator subsystem to the second output.

In the alternative, the range selection subsystem may include an enablement valve assembly in downstream fluid communication with the pressure regulator subsystem, a first mode valve assembly in downstream fluid communication with the enablement valve assembly, and a second mode valve assembly in downstream fluid communication with the first mode valve assembly. The enablement valve assembly may be configured to transmit pressurized hydraulic fluid from the pressure regulator subsystem to the first mode valve when in an enabled position. The first mode valve assembly may be configured to transmit pressurized hydraulic fluid from the enablement valve assembly to the second mode valve assembly. The second mode valve assembly may be configured to transmit pressurized hydraulic fluid from the first mode valve assembly to the first output when in a first position, and the second mode valve assembly may be further configured to transmit pressurized hydraulic fluid from the first mode valve assembly to the second output when in a second position.

The transmission may have a Park mode and an Out of Park mode of operation. A park servo valve may be disposed in downstream fluid communication with the first mode valve assembly and the second mode valve assembly. A park lock mechanism may be mechanically coupled to the park servo valve, and the park servo valve may be configured to mechanically move the park lock mechanism to place the transmission into and out of the Park mode.

The enablement valve assembly may include a line pressure input in downstream fluid communication with the pressure regulator subsystem and a range feed output. The line pressure input may communicates with the range feed output when the enablement valve is in the enabled position.

The first output may be a Drive output of the second mode valve assembly and the second output may be a Reverse output of the second mode valve assembly. The second mode valve assembly may also include first and second inputs. The first input may be in downstream fluid communication with a first mode output of the first mode valve, and the second input may be in downstream fluid communication with a second mode output of the first mode valve. The first input may be configured to communicate with the Drive output when the second mode valve is in a first position, and the second input may be configured to communicate with the Reverse output when the second mode valve is in the second position.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

FIG. 2 is a shift table illustrating exemplary positions of various valves and actuators of the hydraulic control system of FIG. 1 in park, reverse, neutral, and nine forward speed ratios, in accordance with the principles of the present disclosure.

DESCRIPTION

Figure 1:
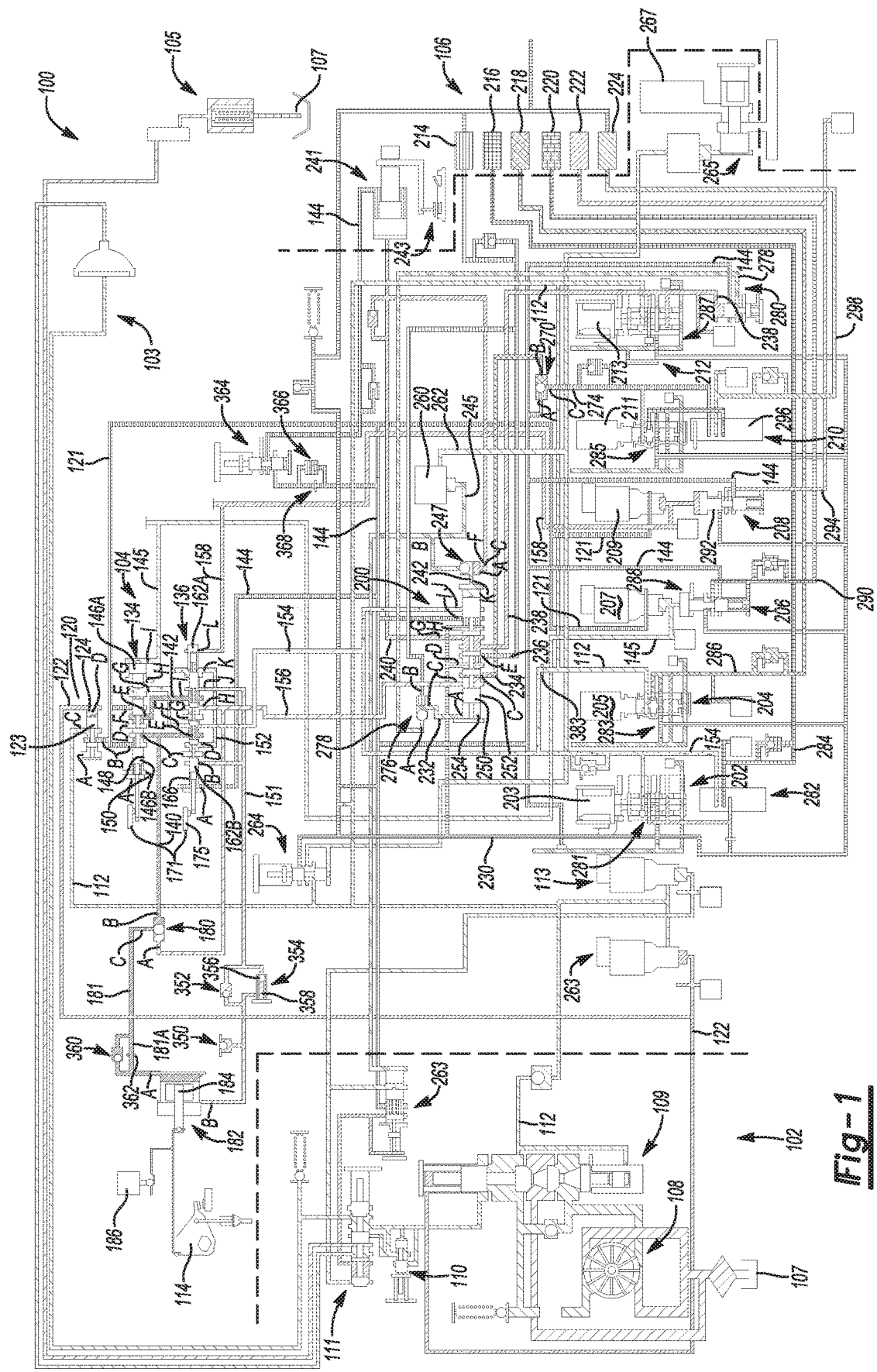
FIG. 1 is a diagram of an example of a hydraulic control system according to the principles of the present disclosure.

With reference to FIG. 1, a portion of a hydraulic control system according to the principles of the present disclosure is generally indicated by reference number 100. The hydraulic control system 100 generally includes a plurality of interconnected or hydraulically communicating subsystems including a pressure regulator subsystem 102, an electronic transmission range selection (ETRS) control subsystem 104, and a clutch control subsystem 106. The hydraulic control system 100 may also include various other subsystems or modules, such as a lubrication and/or cooling subsystem 105 and a torque converter clutch subsystem 103, without departing from the spirit and scope of the present disclosure.

The pressure regulator subsystem 102 is operable to provide and regulate pressurized hydraulic fluid, such as transmission oil, throughout the hydraulic control system 100. The pressure regulator subsystem 102 draws hydraulic fluid from a sump 107. The sump 107 is a tank or reservoir preferably disposed at the bottom of a transmission housing to which the hydraulic fluid returns and collects from various components and regions of the transmission.

The hydraulic fluid is forced from the sump 107 and communicated throughout the hydraulic control system 100 via a pump 108. The pump 108 is preferably driven by an engine (not shown) and may be, for example, a gear pump, a vane pump, a gerotor pump, or any other positive displacement pump. The pressure regulator subsystem 102 may also include an alternate source of hydraulic fluid that includes an auxiliary pump (not shown) preferably driven by an electric engine, battery, or other prime mover (not shown). The pump 108 feeds pressurized hydraulic fluid at line pressure to a line pressure regulator valve 109. The line pressure regulator valve 109 communicates pressurized hydraulic fluid to a lubrication boost valve 110, a torque converter clutch (TCC) control valve 111, and a main supply line 112. The lubrication boost valve 110 and the TCC control valve 111 each feed the lubrication and TCC circuits 105, 103. The main supply line 112 feeds the ETRS subsystem 104 and the clutch actuator subsystem 106 as well as a TCC solenoid 113. The TCC solenoid 113 may be normally low, by way of example.

The ETRS control subsystem 104 connects the pressure regulator subsystem 102 with the clutch control subsystem 106. Generally, the ETRS control subsystem 104 converts electronic input for a requested range selection (Drive, Reverse, Park) into hydraulic and mechanical commands. The hydraulic commands use line pressure hydraulic fluid from the pressure regulator subsystem 102 via fluid line 112 to supply hydraulic fluid to the clutch actuator subsystem 106. The mechanical commands include engaging and disengaging a park mechanism 114.

The ETRS control subsystem 104 includes an enablement valve assembly 120. The enablement valve assembly includes fluid ports 120A-D. Fluid port 120A is an exhaust port that communicates with the sump 107 or an exhaust backfill circuit. Fluid port 120B communicates with a range feed line 121. Fluid port 120C communicates with the main supply line 112. Fluid port 120D communicates with a signal line 122. The enablement valve assembly 120 further includes a spool valve 123 slidably disposed within a bore 124. When pressurized fluid is supplied through the signal line 122, fluid pressure acts upon the spool valve 123 through the fluid port 120D and moves the spool valve 123 against a spring 126 into a stroked or enabled position, by way of example. The spool valve 123 is actuated to a de-stroked position by the spring 126. When the spool valve 123 is stroked, the fluid port 120C communicates with the fluid port 120B.

The ETRS subsystem 104 further includes first and second mode valve assemblies 134, 136 that communicate in series with one another and with the enablement valve assembly 120. The first mode valve 134 includes ports 134A-I, numbered consecutively from left to right. Ports 134A, D, and H are exhaust ports that communicate with the sump 107 or an exhaust backfill circuit. Ports 134B and 134F communicate with the range feed line 121. Port 134C communicates with a fluid line 140. Port 134E communicates with a fluid line 142. Port 134G communicates with a Drive line 154. Port 134I communicates with a signal line 145.

The first mode valve assembly 134 further includes spool valves 146A and 146B slidably disposed within a bore 148. The spool valves 146A, 146B are actuated by the hydraulic fluid provided through lines 154 and 145 and by a spring 150. The spool valves 146A, 146B are moveable between a stroked position, where the spring 150 is compressed (as shown in FIG. 1), and a de-stroked position, where the spring 150 is expanded. In the de-stroked position, port 134F communicates with port 134E. Accordingly, the range feed line 121 communicates with line 142. When the first mode valve assembly 134 is stroked, port 134F is closed while port 134E exhausts and port 134B communicates with port 134C such that the range feed line 121 communicates with line 140.

The second mode valve assembly 136 generally includes ports 136A-L. Ports 136C and 136G are exhaust ports that communicate with the sump 107 or an exhaust backfill circuit, with port 136K having an optional exhaust port. Port 136A communicates with a fluid line 144. Ports 136B and 136J communicate with a Park feed line 151. Port 136D communicates with a sequence line 152 that communicates with port 136K. Port 136E communicates with fluid line 140. Port 136F communicates with a Drive line 154. Port 136H communicates with a Reverse line 156. Port 136I communicates with fluid line 142. Fluid port 136L communicates with a signal line 158.

The second mode valve assembly 136 includes spool valves 162A and 162B slidably disposed within a bore 164. The spool valve 164 is moveable between a stroked position, where a spring 166 is compressed, and a de-stroked position, where the spring 166 is expanded or not compressed. In the de-stroked position, port 136E communicates with port 136F and port 136I communicates with port 136J and port 136H exhausts. In the stroked position, the port 136E communicates with the port 136D providing signal feedback to port 136K. Also, port 136I communicates with port 136H and feeds the Reverse fluid line 156 while ports 136B and 136F exhaust. Therefore, when the first mode valve 134 is stroked, the transmission is in "Drive" when the second mode valve assembly 136 is de-stroked and is providing hydraulic fluid to Drive line 154 and to the "1 feed" line 140, which will be described in further detail below.

The first mode valve assembly 134 may include one, two, or more position sensors 171, and the second mode valve assembly 136 may include one or more position sensors 175, by way of example.

A check valve 180 is connected to fluid lines 140 and 156. The check valve 180 includes three ports 180A-C. Port 180A is connected to the Reverse fluid line 156. Port 180B is connected to fluid line 140. Port or outlet 180C is connected to an out-of-Park (OOP) fluid line 181. The check valve 180 closes off whichever of the ports 180A and 180B that is delivering the lower hydraulic pressure and provides communication between the outlet port 180C and whichever of the ports 180A and 180B has or is delivering higher hydraulic pressure.

The into-Park fluid line 151 and the OOP fluid line 181 each communicate with a Park servo valve 182. The Park servo valve 182 includes ports 182A and 182B, each located on either side of a piston 184. The piston 184 is mechanically coupled to the park mechanism 114. Port 182A communicates with the OOP fluid line 181, and port 182B communicates with the into-Park fluid line 151. The piston 184 moves upon contact by the hydraulic fluid supplied by one of the fluid lines 181, 151, thereby mechanically disengaging or engaging the Park mechanism 114.

A blow-off valve 350 is disposed in the into-Park fluid line 141. In addition, first and second one-way valves 352, 354 are disposed in parallel in the into-Park fluid line 151. The first one-way valve 352 allows fluid to flow from the park servo valve 182 to the second mode valve 136, but not in the reverse direction from the second mode valve 136 to the park servo valve 182. On the other hand, the second one-way valve 354 allows fluid to flow from the second mode valve 136 to the park servo valve 182, but only if the force of the fluid pressure exceeds a spring force acting on the ball 356 by a spring 358. The second one-way valve 354 does not permit fluid to flow in the direction from the park servo valve 182 to the second mode valve 136.

Another one-way valve 360 is disposed on parallel with a small orifice 362 disposed in a leg 181A of the OOP fluid line 181. The one-way valve 360 allows fluid to flow from the park servo valve 182 toward the check valve 180, but not in the reverse direction from the check valve 180 to the park servo valve 182. The small orifice 362 in the leg 181A allows fluid to flow in either direction, but the small orifice 362 slows down the accumulation of fluid on either side by limiting the path through which the fluid can flow.

The Park mechanism 114 is connected with an out-of-Park (OOP) solenoid 186. The OOP solenoid 186 is actuatable to mechanically prevent the Park mechanism 114 from engaging during an engine stop-start event (i.e. when the vehicle is intended to be mobile during an automatic engine stop). The OOP solenoid 186 may also be used to disengage the Park servo valve 182 when it is desirable to operate in Drive or Reverse at other times.

As noted above, the ETRS subsystem 104 feeds hydraulic fluid to the clutch actuation control subsystem 106 via the range feed line 121, the Drive line 154 and the Reverse line 156, while the clutch actuation control subsystem 106 provides hydraulic control signals back to the ETRS subsystem 104 via signal lines 122, 144, 145, and 158. The clutch actuation control subsystem 106 generally includes a clutch select valve assembly 200 and a plurality of clutch regulation assemblies 202, 204, 206, 208, 210, and 212. Each of the clutch regulation assemblies 202, 204, 206, 208, 210, 212 are associated with one of a plurality of clutch actuators 214, 216, 218, 220, 222, and 224. The clutch actuators 214, 216, 218, 220, 222, 224 are hydraulically actuated pistons that each engage one of a plurality of torque transmitting devices (clutches or brakes) to achieve various forward, or drive, speed ratios and reverse speed ratios.

The clutch select valve assembly 200 generally includes ports 200A-K. Ports 200D and 200H communicate with an exhaust backfill circuit 230. Port 200A communicates with a signal fluid line 232. Port 200B communicates with the Reverse fluid line 156. Port 200C communicates with a clutch feed line 234. Port 200E communicates with a clutch feed line 236. Port 200F communicates with a clutch feed line 238. Port 200G communicates with a selectable one-way clutch (SOWC) feed line 240. The SOWC feed line 240 communicates with a SOWC servo actuator 241 that is operable to engage a selectable one-way clutch 243. The SOWC servo actuator 241 also communicates with the Drive/signal line 144 through a SOWC feed limit valve 364. The SOWC feed limit valve 364 communicates with a one-way valve 366 disposed in parallel with a fluid line having a small orifice 368. Port 200I communicates with the signal line 144. Port 200J communicates with the Drive line 154. Port 200K communicates with a signal line 242.

The clutch select valve assembly 200 includes a spool valve 250 slidably disposed within a bore 252. The spool valve 250 is moveable between a stroked position, where a spring 254 is compressed, and a de-stroked position, where the spring 254 is not compressed. In the de-stroked position, port 200B is closed, ports 200C and 200G exhaust to the backfill circuit 230, port 200F communicates with port 200E, and port 200J communicates with port 200I. Therefore, the clutch select valve 200 provides hydraulic fluid to the signal line 144 and the feed line 238 provides hydraulic fluid to feed line 236 when the first mode valve 134 is stroked, and the second mode valve assembly 136 is de-stroked. The feed line 236 communicates with the clutch actuator 214. In the stroked position, port 200B communicates with port 200C, ports 200E and 200I communicate with the exhaust backfill circuit 230, port 200F communicates with port 200G, and port 200J is blocked. Therefore the Reverse feed line 156 feeds the feed line 234 while the clutch feed line 238 feeds the SOWC feed line 240.

The clutch select valve assembly 200 is stroked when hydraulic fluid is communicated through a clutch select solenoid 260 to fluid port 200K via signal line 242. The clutch select solenoid communicates fluid to the signal line 242 through a signal line 245. A check valve 247 is disposed between the signal lines 242 and 245, as well as SOWC feed line 240. The check valve 247 has a port 247A in communication with the signal line 242, a port 247B in communication with the signal line 245, and a port 247C in communication with the SOWC feed line 240. The clutch select solenoid 260 receives hydraulic fluid from a feed line 262 that communicates with the main supply line 112 through a feed limit valve 264. The feed line 262 also supplies hydraulic fluid to an oil level valve 265 that selectively transfers fluid from a front cover 267 to the sump 107. The feed limit valve 264 communicates with a solenoid 263 that communicates with fluid line 122. The signal line 242 also provides hydraulic fluid to a TCC regulation valve 266.

A check valve 270 is connected to fluid lines 144 and 234. The check valve 270 includes three ports 270A-C. Port 270A is connected to the Drive and signal line 144. Port 270B is connected to the feed line 234. Port or outlet 270C is connected to a clutch feed line 274. The check valve 270 closes off whichever of the ports 270A and 270B is delivering the lower hydraulic pressure and provides communication between the outlet port 270C and whichever of the ports 270A and 270B has or is delivering the higher hydraulic pressure.

A check valve 276 is connected to fluid lines 232, 236, and 278. The check valve 276 includes three ports 276A-C. Port 276A is connected to the latch feed line 278. Port 276B is connected to the feed line 236. Port or outlet 276C is connected to the signal line 232. The check valve 276 closes off whichever of the ports 276A and 276B is delivering the lower hydraulic pressure and provides communication between the outlet port 276C and whichever of the ports 276A and 276B has or is delivering the higher hydraulic pressure.

A latch valve assembly 280 selectively communicates hydraulic fluid from the Drive/signal line 144 to the latch feed line 278. The latch valve assembly 280 is engaged by a hydraulic signal from the feed line 238.

The clutch regulation assembly 202 includes a variable force solenoid 203, a regulator valve 281, and a boost valve 282. The regulator valve 281 is connected to the Drive line 154 and to the boost valve 282. The boost valve 282 is also connected to the Drive line 154 and to an actuator feed line 284. The regulator valve 281 receives hydraulic fluid from the Drive line 154 and selectively communicates the Drive line hydraulic fluid to the boost valve 282 to move the boost valve 282. The boost valve 282 in turn selectively communicates the Drive line hydraulic fluid to the actuator feed line 284. The actuator feed line 284 communicates with the clutch actuator 216. The regulator valve 281 is normally high so that it has high pressure when power is off. Accordingly, the regulator valve 281 continues to feed clutch actuator 216 in the event of a default or loss in power.

The clutch regulation assembly 204 includes a variable force solenoid 205 and a regulator valve 283 that is connected to the Drive line 154. The variable force solenoid 205 may be normally low, by way of example. The regulator valve 283 receives hydraulic fluid from the main pressure line 112 and selectively communicates the main line hydraulic fluid to an actuator feed line 286. The actuator feed line 286 communicates with the clutch actuator 218. The drive line 154 may be optionally connected to the main line 112 connection to the regulator valve 283 by opening a blocker 383.

The clutch regulation assembly 206 includes a variable flow solenoid 207 and a regulator valve 288. The variable flow solenoid 207 may be normally low, by way of example. The solenoid 207 is connected to the range feed line 121 and to the signal line 145. The regulator valve 288 is connected to the signal line 145, to the Drive/signal line 144, and to an actuator feed line 290. The solenoid 207 receives hydraulic fluid from the range feed line 121 and selectively communicates the range feed line hydraulic fluid to the signal line 145 in order to move the regulator valve 288. The regulator valve 288 in turn selectively communicates the Drive/signal line hydraulic fluid to the actuator feed line 290. The actuator feed line 290 communicates with the clutch actuator 220.

The clutch regulation assembly 208 includes a variable flow solenoid 209 and a regulator valve 292. The variable flow solenoid 209 may be normally low, by way of example. The solenoid 209 is connected to the range feed line 121 and to the signal line 158. The regulator valve 292 is connected to the signal line 158, to the Drive/signal line 144, and to an actuator feed line 294. The solenoid 209 receives hydraulic fluid from the range feed line 121 and selectively communicates the range feed line hydraulic fluid to the signal line 158 in order to move the regulator valve 292. The regulator valve 292 in turn selectively communicates the Drive/signal line hydraulic fluid to the actuator feed line 294. The actuator feed line 294 communicates with the clutch actuator 222.

The clutch regulation assembly 210 includes a variable force solenoid 211, a regulator valve 285, and a boost valve 296. The variable force solenoid 211 may be normally low, by way of example. The regulator valve 285 is connected to the feed line 274 and to the boost valve 296. The boost valve 296 is also connected to the feed line 274 and to an actuator feed line 298. The regulator valve 285 receives hydraulic fluid from the feed line 274 and selectively communicates the feed line hydraulic fluid to the boost valve 296 to move the boost valve 296. The boost valve 296 in turn selectively communicates the feed line hydraulic fluid to the actuator feed line 298. The actuator feed line 298 communicates with the clutch actuator 224.

The clutch regulation assembly 212 includes a variable force solenoid 213 and a regulator valve 287 that is connected to the main supply line 112. The regulator valve 287 receives hydraulic fluid from the main supply line 112 and selectively communicates the line pressure hydraulic fluid to the feed line 238. The position of the clutch select valve 200 determines whether the feed line 238 communicates with the feed line 236 or the SOWC feed line 240. The regulator valve 287 is normally high so that it has high pressure when power is off. Accordingly, the regulator valve 287 continues to feed the feed line 238 in the event of a default or loss in power. Depending on the position of the clutch select valve 200 at the moment of default or loss in power, the feed line 238 may communicate with the clutch actuator 214 or the SOWC feed line 240.

Selective actuation of combinations of clutch regulator assemblies and valve positions allows the hydraulic control system 100 to selectively engage combinations of the plurality of clutches and brakes. One example of such combinations is illustrated in FIG. 2, where section A shows positions of the clutch actuator solenoids 214, 216, 218, 220, 222, 224, the SOWC solenoid 241, the clutch select solenoid 260, and the out of park solenoid (or PISA) 186; and section B shows positions of the first and second mode valves 134, 136 and the park servo valve 182.

For example, in park, five of the clutch actuators 216, 218, 220, 222, and 224 and the out of part solenoid 183 may be off or low, while the SOWC solenoid 241 and/or the clutch actuator 214 and the clutch select solenoid 260 may be on or high. Each of the valves 134, 136, and 182 may be in a first position of the valves 134, 136, 182, indicated by a "0" in FIG. 2.

In reverse, the clutch actuators 216, 218, 220 may be off or low, while the SOWC solenoid 241 and/or the clutch actuator 214, the clutch actuators 222, 224, the clutch select solenoid 260, and the out of park solenoid 186 may be on or high. The first mode valve 134 may be in the first position of the mode valve 134, and the second mode valve 136 and the park servo valve 182 may be in a second position, indicated by a "1" in FIG. 2.

In neutral-shift, the clutch actuators 216, 218, 224 may be off or low, while the SOWC solenoid 241 and/or the clutch actuator 214, the clutch actuators 220, 222, the clutch select solenoid 260, and the out of park solenoid 186 may be on or high. The first and second mode valves 134, 136 and the park servo valve 182 may all be in their second positions.

In neutral-LO, five of the clutch actuators 216, 218, 220, 222, 224 may be off or low, while the SOWC solenoid 241 and/or the clutch actuator 214, the clutch select solenoid 260, and the out of park solenoid 186 may be on or high. The first and second mode valves 134, 136 may be in their first positions, and the park servo valve 182 may be in its second position.

In neutral-HI, the clutch actuators 216, 218, 220, 224, the SOWC solenoid 241 and/or the clutch actuator 214, and the clutch select solenoid 260 may be off or low, while the clutch actuator 222 and the out of park solenoid 186 may be on or high. The first mode valve 134 may be in its first position, and the second mode valve 136 and the park servo valve 182 may be in their second positions.

In a first gear Drive1B, the clutch actuators 218, 220, 222, 224 may be off or low, while the clutch actuator 216, the SOWC solenoid 241 and/or the clutch actuator 214, the clutch select solenoid 260, and the out of park solenoid 186 may be on or high. The second mode valve 136 may be in its first position, while the first mode valve 134 and the park servo valve 182 may be in their second positions.

In a first gear Drive1FW, the clutch actuators 218, 220, 222, 224, the SOWC solenoid 241 and/or the clutch actuator 214, and the clutch select solenoid 260 may be off or low, while the clutch actuator 216 and the out of park solenoid 186 may be on or high. The second mode valve 136 may be in its first position, while the first mode valve 134 and the park servo valve 182 may be in their second positions.

In a second gear Drive2, the clutch actuators 220, 222, 224, the SOWC solenoid 241 and/or the clutch actuator 214, and the clutch select solenoid 260 may be off or low, while the clutch actuators 216, 218 and the out of park solenoid 186 may be on or high. The second mode valve 136 may be in its first position, while the first mode valve 134 and the park servo valve 182 may be in their second positions.

In a third gear Drive3, the clutch actuators 218, 222, 224, the SOWC solenoid 241 and/or the clutch actuator 214, and the clutch select solenoid 260 may be off or low, while the clutch actuators 216, 220 and the out of park solenoid 186 may be on or high. The second mode valve 136 may be in its first position, while the first mode valve 134 and the park servo valve 182 may be in their second positions.

In a first gear Drive1FW, the clutch actuators 218, 220, 222, 224, the SOWC solenoid 241 and/or the clutch actuator 214, and the clutch select solenoid 260 may be off or low, while the clutch actuator 216 and the out of park solenoid 186 may be on or high. The second mode valve 136 may be in its first position, while the first mode valve 134 and the park servo valve 182 may be in their second positions.

In a fourth gear Drive4, the clutch actuators 218, 220, 224, the SOWC solenoid 241 and/or the clutch actuator 214, and the clutch select solenoid 260 may be off or low, while the clutch actuators 216, 222 and the out of park solenoid 186 may be on or high. The second mode valve 136 may be in its first position, while the first mode valve 134 and the park servo valve 182 may be in their second positions.

In a fifth gear Drive5, the clutch actuators 218, 220, 222, the SOWC solenoid 241 and/or the clutch actuator 214, and the clutch select solenoid 260 may be off or low, while the clutch actuators 216, 224 and the out of park solenoid 186 may be on or high. The second mode valve 136 may be in its first position, while the first mode valve 134 and the park servo valve 182 may be in their second positions.

In a sixth gear Drive6, the clutch actuators 218, 220, 222, 224 and the clutch select solenoid 260 may be off or low, while the clutch actuator 216, the SOWC solenoid 241 and/or the clutch actuator 214, and the out of park solenoid 186 may be on or high. The second mode valve 136 may be in its first position, while the first mode valve 134 and the park servo valve 182 may be in their second positions.

In a seventh gear Drive7, the clutch actuators 216, 218, 220, 222 and the clutch select solenoid 260 may be off or low, while the clutch actuator 224, the SOWC solenoid 241 and/or the clutch actuator 214, and the out of park solenoid 186 may be on or high. The second mode valve 136 may be in its first position, while the first mode valve 134 and the park servo valve 182 may be in their second positions.

In an eighth gear Drive8, the clutch actuators 216, 218, 222, 224 and the clutch select solenoid 260 may be off or low, while the clutch actuator 220, the SOWC solenoid 241 and/or the clutch actuator 214, and the out of park solenoid 186 may be on or high. The second mode valve 136 may be in its first position, while the first mode valve 134 and the park servo valve 182 may be in their second positions.

In a ninth gear Drive9, the clutch actuators 216, 220, 222, 224 and the clutch select solenoid 260 may be off or low, while the clutch actuator 218, the SOWC solenoid 241 and/or the clutch actuator 214, and the out of park solenoid 186 may be on or high. The second mode valve 136 may be in its first position, while the first mode valve 134 and the park servo valve 182 may be in their second positions.

In the event of a default or loss of power to the transmission controller, the hydraulic system 100 defaults to drive as long as the transmission is in one of the drive gears. More particularly, the first mode valve 134 is in its second position "1," while the second mode valve 136 is in its first position "0" during all forward drive gears, and therefore, so long as line pressure is available through line 112, Drive oil continues to be fed to the clutch select valve assembly 200 and the clutch regulation valve assembly 202 through drive feed line 154, even in the event of a default. The variable force solenoid 203 (that controls the feed line 284 to the clutch actuator 216) and the variable force solenoid 213 (that controls the feed line 236 to the clutch actuator 214 and the feed line 240 to the SOWC valve 241) are normally high. Accordingly, in an event that the solenoid 203 loses power, the solenoid 203 will cause the regulation valve 281 to continue to feed the clutch actuator 216 by connecting the feed line 284 to the drive feed line 154; and in the event that the solenoid 213 loses power, the solenoid 213 will cause the regulation valve 287 to continue to feed either the clutch actuator 214 or the SOWC (depending on the position of the clutch select valve 200) by connecting line pressure 112 to the feed line 238. The solenoids 205, 207, 211, 213, on the other hand, are normally low and will shut off feed to their respective lines when power is off.

In park, reverse, or neutral, the hydraulic system 100 defaults to park. More particularly, the first mode valve 134 is in its first position "0" instead of its second position "1." Therefore, the first mode valve 134 has the drive feed line 154 shut off. Accordingly, in the event of a default, the drive feed line 154 does not feed the clutch regulation assembly 202. In park, the second mode valve 136 is also in its first position, and the clutch select valve 200 is in its stroked position compressing the spring 254, even without power, because of the latch valve 247. Accordingly, fluid in drive line 144 is exhausted and cannot feed the SOWC valve 241. Furthermore, with the clutch select valve is in the stroked position (as shown in FIG. 1), the feed line 238 cannot feed the clutch actuator 214. Moreover, when the first mode valve 134 is in the first position, range feed line 121 supplies pressure to the into park line 151.

In the event of a loss of power or default while in reverse, the first mode valve 134 is in the first position with the drive feed line 154 shut off and not feeding the clutch regulation assembly 202, and the second mode valve 136 is in the second feeding reverse line 156 fluid to the clutch select valve 200 and to the feed line 234; however, the clutch regulation valve assembly 210 that receives the feed line 234 is off when there is a power loss and does not ultimately feed the clutch actuator 224. Moreover, when the first mode valve 134 is in the first position, range feed line 121 supplies pressure to the into park line 151.

Neutral follows a similar scheme as park and reverse. In neutral HI and LO, the first mode valve 134 is in the first position, and therefore, the range feed line 121 supplies pressure to the into park line 151.

Figure 3:
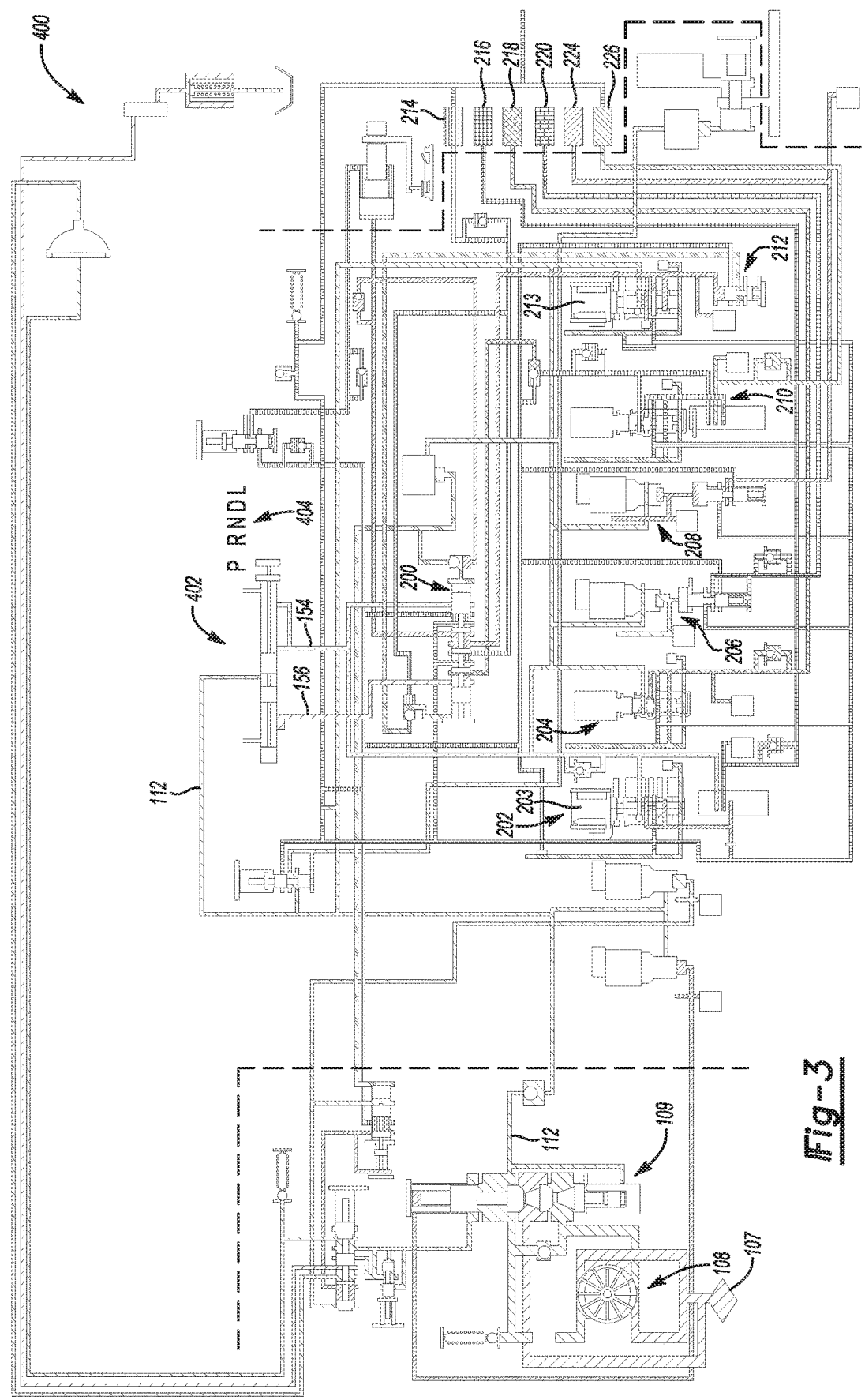
FIG. 3 is a diagram of another example of a hydraulic control system, having a manual valve, according to the principles of the present disclosure.

Turning to FIG. 3, an alternate embodiment of a hydraulic control system is generally indicated by reference number 400. The hydraulic control system 400 is substantially similar to that shown in FIG. 1, and like components are indicated by like reference numbers, or reference numbers may be omitted altogether for components already labeled in FIG. 100. However, in the hydraulic control system 400, the ETRS subsystem has been replaced by a manual valve 402. The manual valve 402 communicates with the main supply line 112, the Reverse line 156, and the Drive line 154. Movement of a range selector 404 of an operator of the motor vehicle in turn translates the manual valve 402 between various positions including a Reverse position and a Drive position. In the Drive position, the main supply line 112 provides hydraulic fluid at line pressure to the Drive line 154. In the Reverse position, the main supply line 112 provides hydraulic fluid at line pressure to the Reverse line 156. The rest of the components of the hydraulic control system 400 may be the same and operate the same as those described above with respect to FIG. 1. For example, the hydraulic control system 400 has a pump 108 that supplies line 112 through a line pressure regulation valve 109, as well as a clutch selection valve 200, clutch regulation valve assemblies 202, 204, 206, 208, 210, 212, a SOWC valve assembly 241, and clutch actuators 214, 216, 218, 220, 222, 224. Variable force solenoids 203, 213 may be normally high, as described above with respect to FIG. 1.

The description of the invention is merely exemplary in nature and variations that do not depart from the general essence of the invention are intended to be within the scope of the invention. Such variations are not to be regarded as a departure from the spirit and scope of the invention.

The following is claimed:

1. A hydraulic control system for a transmission, the transmission having a plurality of torque transmitting devices selectively engageable to provide a plurality of forward speed ratios and at least one reverse speed ratio, the hydraulic control system comprising:
   a pressure regulator subsystem configured to provide a pressurized hydraulic fluid:
   a range selection subsystem in downstream fluid communication with the pressure regulator subsystem having first and second outputs;
   a clutch select valve assembly in downstream fluid communication with the first and second outputs, wherein the clutch select valve assembly is configured to move between a first position and a second position;
   a plurality of clutch actuators in downstream fluid communication with the clutch select valve assembly, each clutch actuator of the plurality of clutch actuators configured to actuate at least one torque transmitting device of the plurality of torque transmitting devices;
   a plurality of control devices configured to regulate transmission of the pressurized hydraulic fluid to the plurality of clutch actuators, wherein a first control device of the plurality of control devices is pressurized when no power is provided to the first control device, the first control device being configured to provide pressure to a first clutch actuator of the plurality of clutch actuators when no power is provided to the first control device so that the transmission is in any forward speed ratio of the plurality of forward speed ratios when no power is provided to the first control device, wherein a second control device of the plurality of control devices is pressurized when no power is provided to the second control device, and wherein the plurality of clutch actuators includes at least six clutch actuators and the plurality of control devices includes at least six control devices, each control device of the plurality of control devices being configured to regulate transmission of the pressurized hydraulic fluid to a clutch actuator of the plurality of clutch actuators, wherein four of the six control devices are configured to shut off pressure when power is off, the plurality of control devices being electrically activated solenoids;
   a park servo valve in downstream fluid communication with the first mode valve assembly and the second mode valve assembly;
   a park lock mechanism mechanically coupled to the park servo valve, wherein the park servo valve is configured to mechanically move the park lock mechanism to place the transmission into and out of the Park mode; and
   a selectable one-way clutch (SOWC) actuator in downstream fluid communication with the clutch select valve assembly and configured to actuate a selectable one-way clutch, wherein the clutch select valve assembly is configured to transmit the pressurized hydraulic fluid from the first output to the SOWC actuator when in the first position and wherein the clutch select valve assembly is configured to transmit the pressurized hydraulic fluid from the second output to a second clutch actuator of the plurality of clutch actuators when in the second position, wherein the second clutch actuator and a second torque transmitting device of the plurality of torque transmitting devices are engaged in the reverse speed ratio, and wherein the selectable one-way clutch, a first clutch actuator, and a first torque transmitting device of the plurality of torque transmitting devices are engaged in a predetermined forward speed ratio of the plurality of forward speed ratios, wherein the range selection subsystem comprises:

an enablement valve assembly in downstream fluid communication with the pressure regulator subsystem;

a first mode valve assembly in downstream fluid communication with the enablement valve assembly; and a second mode valve assembly in downstream fluid communication with the first mode valve assembly, wherein the enablement valve assembly is configured to transmit the pressurized hydraulic fluid from the pressure regulator subsystem to the first mode valve assembly when in an enabled position, wherein the first mode valve assembly is configured to transmit the pressurized hydraulic fluid from the enablement valve assembly to the second mode valve assembly, the second mode valve assembly is configured to transmit the pressurized hydraulic fluid from the first mode valve assembly to the first output when in a first position, and the second mode valve assembly is configured to transmit the pressurized hydraulic fluid from the first mode valve assembly to the second output when in a second position, the transmission having a Park mode and an Out of Park mode of operation, the first mode valve assembly having a first mode valve moveable between a first position and a second position, the park servo valve being in fluid communication with a one-way valve disposed in an out-of-park fluid line in parallel with an orifice, the park servo valve being in fluid communication with an into-park fluid line, the out-of-park fluid line being in fluid communication with the first mode valve assembly and with the second mode valve assembly, the into-park fluid line being in fluid communication with the second mode valve assembly.

* * * * *